United States Patent [19]

Saito

[11] 4,432,210
[45] Feb. 21, 1984

[54] AIR CONDITIONING CONTROL METHOD
[75] Inventor: Takao Saito, Aichi, Japan
[73] Assignee: Toyota Jidosha Kogyo Kabushiki Kaisha, Toyota, Japan
[21] Appl. No.: 352,065
[22] Filed: Feb. 24, 1982
[30] Foreign Application Priority Data Apr. 3, 1981 [JP] Japan ............................ 56-50348

[51] Int. Cl.$^3$ ............................................ F25B 49/00
[52] U.S. Cl. ................................. 62/126; 364/557; 364/187
[58] Field of Search .............. 62/125, 126, 127, 129, 62/130; 236/94; 165/11; 324/51; 340/635, 652, 653; 364/557, 505, 506, 418, 184, 187; 73/1 R, 1 F; 374/115; 318/563

[56] References Cited
U.S. PATENT DOCUMENTS

| | | | |
|---|---|---|---|
| 4,025,762 | 5/1977 | Rossi et al. | 364/187 |
| 4,122,720 | 10/1978 | Podl | 374/115 X |
| 4,249,238 | 2/1981 | Spang et al. | 364/185 X |
| 4,337,821 | 7/1982 | Saito | 165/12 |
| 4,345,714 | 8/1982 | Kojima | 165/12 X |

FOREIGN PATENT DOCUMENTS 2072883 10/1981 United Kingdom ............... 364/184

Primary Examiner—Albert J. Makay
Assistant Examiner—Harry Tanner
Attorney, Agent, or Firm—Cushman, Darby & Cushman

[57] ABSTRACT

When a plurality of sensors or a circuit, required for air conditioning, are out of order a fail-safe calculation formula is employed to set the desired outlet air temperature for continuing air conditioning. A number of fail-safe calculation formulae exist so that an accurate outlet air temperature can be obtained despite any abnormal sensor conditions. When an abnormality is detected, the calculation formula which does not employ the output of the abnormal sensor is utilized to determine the outlet air temperature. This procecure permits an air conditioning apparatus to be controlled within a range of safety even when a sensor or sensors fail.

18 Claims, 5 Drawing Figures

AIR CONDITIONING CONTROL METHOD

BACKGROUND OF THE INVENTION

1. Field of the Invention

The present invention relates to an air conditioning control method for controlling an air conditioning apparatus provided in a vehicle by means of an electronic control system comprising a computer or the like.

2. Description of the Prior Art

Recently, practitioners in the art have attempted to develop automated air conditioning apparatus for a motor vehicle including a combination of sensors and electronic circuits provided inside and outside the vehicle. With this arrangement, the operations performed by a driver can be decreased in frequency and improvements in safety and comfortability can be achieved.

In such apparatus, a control program is executed based on data obtainable from the various sensors (monitoring room air temperature, ambient air temperature, evaporator outlet temperature, water temperature, solar radiation and the like) so as to drive and control an actuator. For this reason, when a failure occurs with a room air temperature sensor, an ambient air temperature sensor, etc., or a break occurs in a circuit, the calculated, desired air outlet temperature is offset from the normal value to an unusually high or low value, thereby disabling the air conditioning control which would be performed during normal conditions.

SUMMARY OF THE INVENTION

The present invention has as its object the provision of a method of controlling air conditioning in which air conditioning apparatus can be controlled within the range of safety even when the apparatus is out of order.

To achieve the above-described object, according to the present invention, there are set a plurality of sets of fail-safe calculation formulae, an appropriate one of which operates when the room air temperature sensor, the ambient air temperature sensor or the like goes out of order. In this invention, a plurality of sets of formulae for calculating desired outlet air temperatures are preset for operating in under different conditions, such as normal conditions, abnormal conditions, etc., so that the proper formula corresponding to the working conditions of the sensors can be employed.

DETAILED DESCRIPTION OF THE INVENTION

Figure 1:
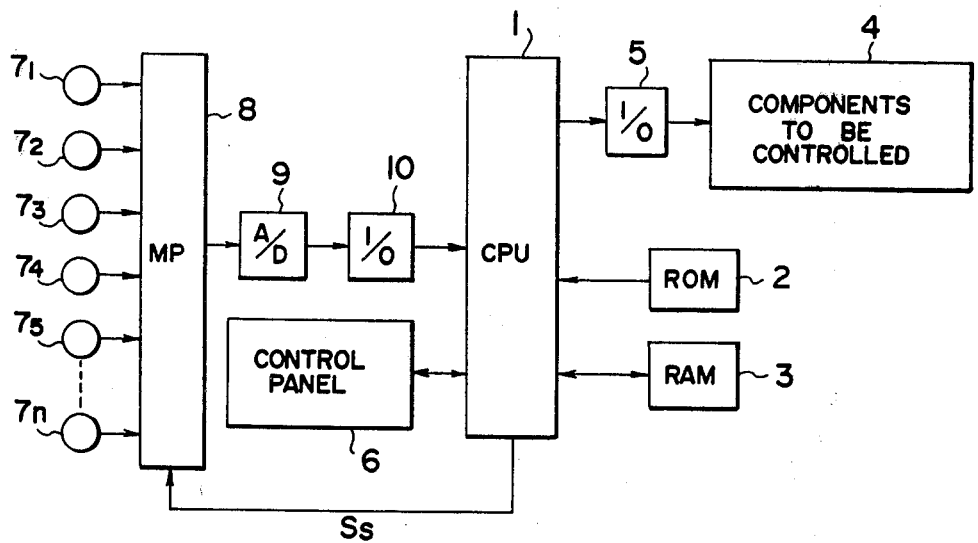
FIG. 1 is a block diagram showing an example of a control system, to which the present invention is applicable.

FIG. 1 is a block diagram showing an example of a control system, to which the present invention is applicable.

A central processing unit (hereinafter referred to as "CPU") is connected to a read only memory 2 (hereinafter referred to as "ROM") and a random access memory 3 (hereinafter referred to as "RAM"). ROM 2 stores therein a control program for controlling components 4 to be controlled and a monitor program, and RAM 3 stores therein data fed from various sensors. The components 4 to be controlled include components and elements such as a outlet air opening change-over valve, a room-ambient air change-over valve, a valve for a damper, a water valve, a heater relay, and a relay for a magnetic clutch. Additionally, CPU 1 is connected to a control panel 6, by which a driver can give a command signal relating to various operation modes for air conditioning, and control panel 6 also indicates various operating conditions. Each of sensors $7_1 \sim 7n$ is selected by a multiplexer (MP) 8, converted into a digital signal by an A/D converter 9, thereafter, taken into CPU 1 through an I/O controller 10, and then, stored in RAM 3. In FIG. 1, the sensor $7_1$ may be a room air temperature sensor, the sensor $7_2$ an ambient air temperature sensor, the sensor $7_3$ an evaporator outlet temperature sensor, the sensor $7_4$ a water temperature sensor, and the sensor $7_5$ a solar radiation sensor. When there are differences in output level between the sensors $7_1 \sim 7n$, it is necessary to provide gain adjusting circuits for unifying the output levels of the respective sensors at the input side of the multiplexer. The control of the outlet air temperature of the air conditioning apparatus is effected, during air heating, by the control of openings of a damper and the water valve and effected, during air cooling, by the control of opening of the damper and the driving of a compressor. In this case, the calculation of the required outlet air temperature is performed by CPU 1 in accordance with the following equation.

$$Tao = Kset \cdot Tset - Kam \cdot Tam - Kr \cdot Tr - Kst \cdot ST + C \quad (1)$$

where Kset, Kam, Kr, Kst and C are constants, Tset a set temperature, Tam ambient temperature, Tr room temperature and ST a value of solar radiation. Out of these, Tset can be desirably manually set by the control panel 6. As apparent from equation (1), the required outlet air temperature Tao is influenced by the ambient air temperature Tam, the room air temperature Tr and the solar radiation value ST. Consequently, the above described three sensors should be taken into account for coping with abnormalities of the sensors. In addition, the water temperature Tw is considered during air heating and the evaporator outlet temperature Te during air cooling where necessary. To determine the abnormality of a sensor, an output from I/O controller 10 is compared with a reference value previously stored by ROM 2 or RAM 3, and, when a sensor output signal varies from the reference value, the presence of a failure or abnormality is determined. CPU1 issure a selection command signal Ss to the multiplexer 8 to select which of the plurality of sensors is being monitored. Alternatively, when each sensor provides data to CPU1, an identification signal can also be provided to indicate the source of the data.

Detailed description will now be given of the contents of calculation of the required blow-out temperature Tao in accordance with the types and combinations of the sensors from one case of failure to another with reference to a flow chart shown in FIGS. 2A and 2B.

(1) Firstly, determination is made in a step 19 as to whether the set temperature Tset is within the normal range or not, when the set temperature is within the normal range, it is used, but, when the set temperature is not within the normal range, the set temperature Tset is set at 25° C. in a step 20, and the process shifts to a step 21.

Figure 2A:
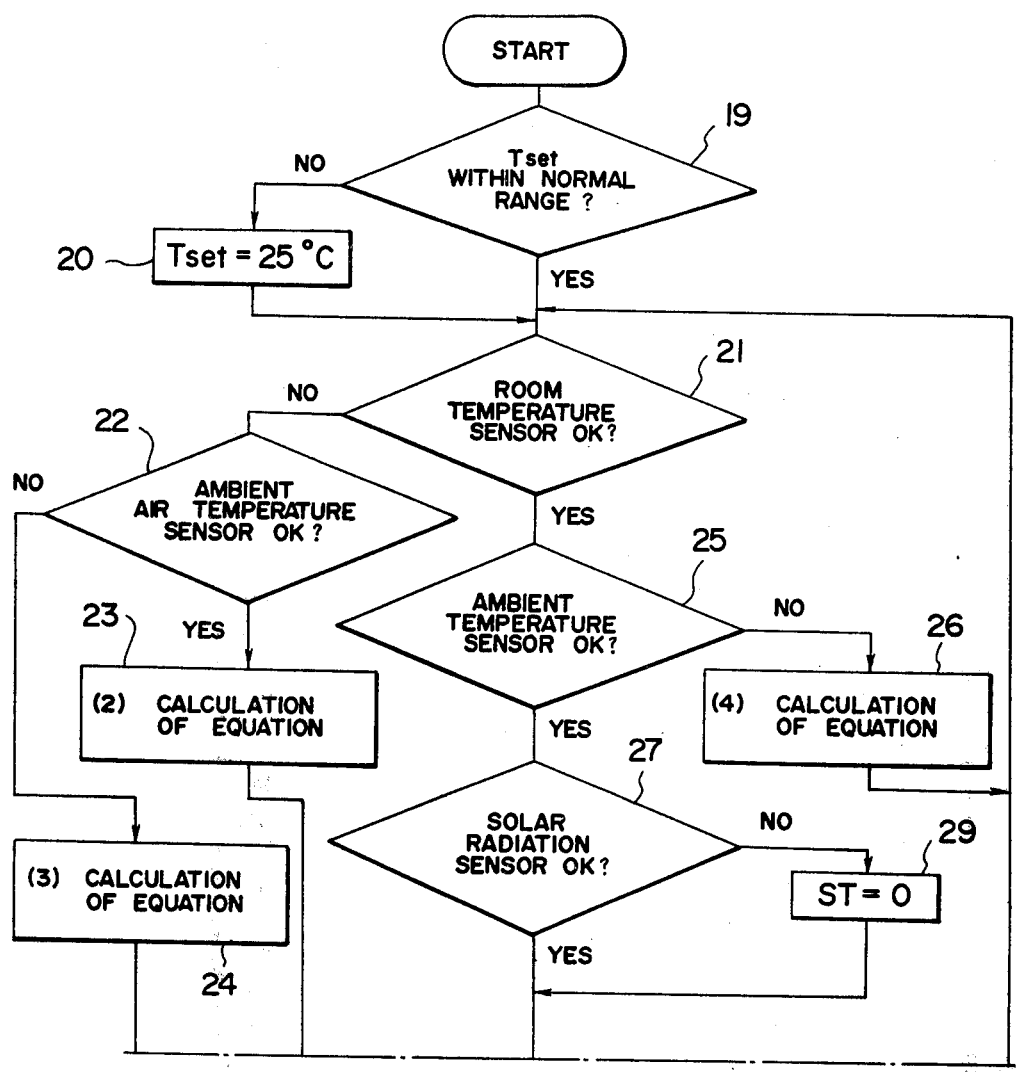
FIGS. 2A and 2B show a process flow chart of the present invention.
Figure 2B:
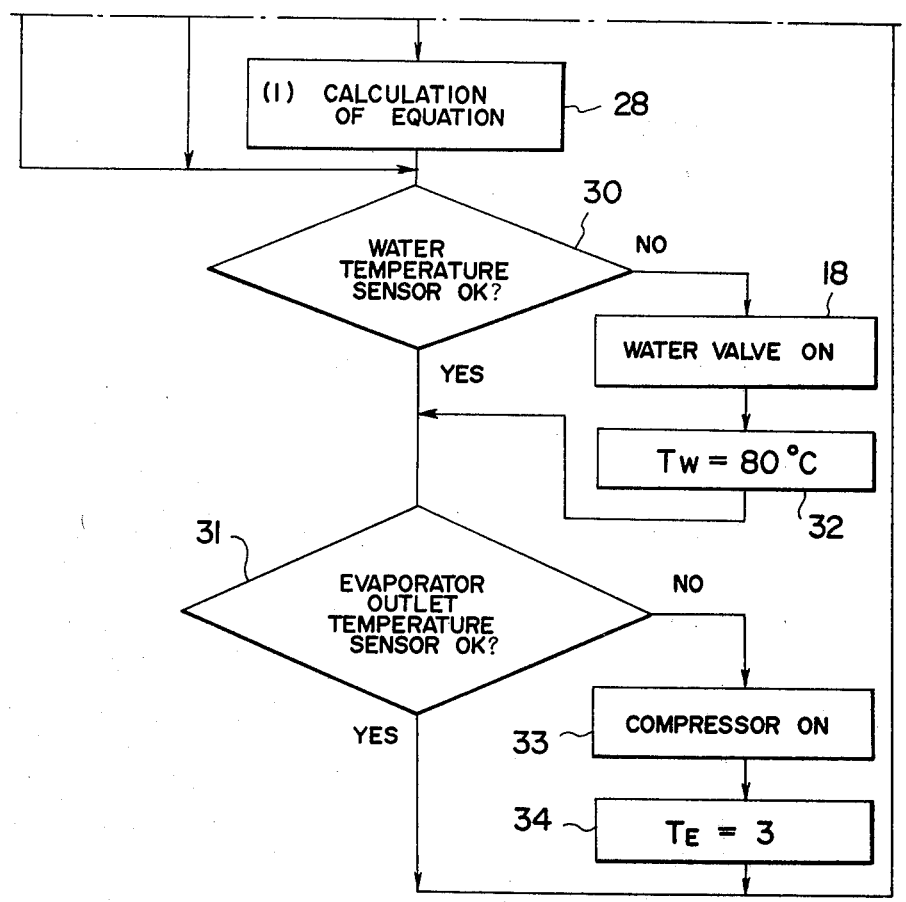
Figure 2:
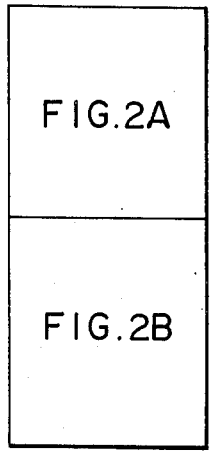
FIG. 2 shows the relationship between FIGS. 2A and 2B.

(2) When the room air temperature sensor $7_1$ is abnormal and the ambient temperature sensor $7_2$ is normal, the process shifts from the step 21 to a step 22 as shown in FIG. 2A, and the required outlet air temperature Tao is calculated based on the following equation (2) in a step 23.

$$\text{Tao} = \text{Cam (Tset} - \text{Tam)} + \text{Tset} \qquad (2)$$

where Cam is a constant.

(3) When both the room air temperature sensor $7_1$ and the ambient air temperature sensor $7_2$ are abnormal, the process shifts from the step 21 through the step 22 to a step 24. A value of temperature shown in the following equation (3) is maintained.

$$\text{Tao} = 25 \,(°C.) \qquad (3)$$

That is, the required temperature is set at 25° C. which is referred to as a comfortable temperature.

(4) When the room air temperature sensor $7_1$ is normal and the ambient temperature sensor $7_2$ is abnormal, the process shifts from the step 21 to a step 25, and finally to step 26. The required outlet air temperature is calculated based on the following equation (4), and the whole process is completed.

$$\text{Tao} = \text{Cr (Tset} - \text{Tr)} + \text{Tset} \qquad (4)$$

where Cr is a constant.

However, when both the room air temperature sensors $7_1$ and $7_2$ are normal, the process shifts to determination as to whether the solar radiation sensor $7_5$ is normal or not. When the solar radation sensor $7_5$ is determined to be normal, the required temperature Tao is calculated based on the aforesaid equation (1) in a step 28.

(5) When the solar radiation sensor $7_5$ is abnormal, the process goes through a step 27 and a step 29. This process is carried out on condition that both the room air temperature sensor 21 and the ambient air temperature sensor 25 are normal. If the solar radiation sensor $7_5$ is determined to be abnormal in the step 27, then the solar radiation value ST is set to zero in step 29 no matter whether the weather condition is good or bad (fair, cloudy or rainy). Consequently, the required outlet air temperature Tao is to be obtained based on the following equation (5).

$$\text{Tao} = \text{Kset} \cdot \text{Tset} - \text{Kam} \cdot \text{Tam} - \text{Kr} \cdot \text{Tr} + C \qquad (5)$$

The equation (5) is obtainable by substituting ST=0 in the equation (1), and the calculation is performed in the step 28.

Now, in order to regulate the actual air outlet temperature in accordance with the required air outlet temperature Tao, it is necessary to control the opening of the damper SW. This control is effected by an actuator 4 and the characteristcs thereof is shown in FIG. 3.

Figure 3:
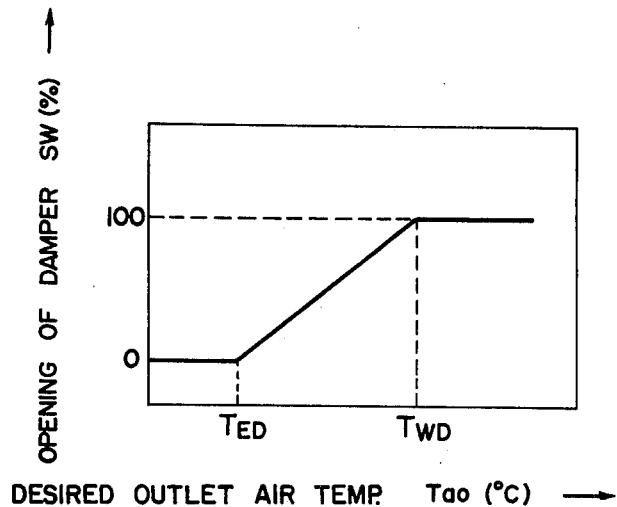
FIG. 3 is a characteristic curve diagram of the opening of the damper against the required blow-out temperature.

In FIG. 3, $T_{ED}$ indicates a corrected evaporator outlet temperature and $T_{WD}$ a corrected water temperature, which are represented by the following equations (6) and (7).

$$T_{WD} = (T_W - T_{ED}) \times \psi + T_{ED} \qquad (6)$$

$$T_{ED} = T_E + 3 \qquad (7)$$

where $T_W$ is water temperature, $\psi$ a constant and $T_E$ the evaporator outlet temperature.

Such corrections of outputs from the steps 23, 24 and 28 as described above are carried out in steps 30 and 31. When both the water temperature sensor $7_4$ and the evaporator outlet temperature sensor $7_3$ are normal, the outputs from the steps 23, 24 and 28 are used for the control as they are, and the whole process is completed. However, if the water temperature sensor $7_4$ is abnormal, the process shifts to the step 18, the water valve is turned on, and the water temperature $T_W$ is regarded as 80° C. and the water temperature is fixed thereto. Furthermore, if the evaporator outlet temperature sensor $7_3$ is abnormal, then the process shifts to a step 33, the compressor is turned on, and the evaporator outlet temperature $T_E$ is set at 3° C. for example, in a step 34. This set temperature is selected so that the interior of a compartment of the vehicle can be heated to a proper temperature. As a result, when the evaporator outlet temperature sensor $7_3$ is abnormal, $T_{ED}$ becomes 6° C.

In the above described embodiment, description has been given of the case where a microcomputer is used, however, the control system according to the present invention may be constructed by use of an analogue circuit in place of the microcomputer.

In general, connections between the air conditioning apparatus and the sensors are achieved by use of connectors, whereby contact failure or off-position of a connector may occur.

Heretofore, there have been encountered difficulties in coping with cases of contact failure, off-position of a connector or a failure of a sensor. However, according to the present invention, the control on the air conditioning can be continued no matter what the case may be.

As apparent from the above, according to the present invention, even when any sensor or sensors connected to the air conditioning functions fall into abnormal condition, the control on the air conditioning can be continued within the predetermined optimal range.

It should be apparent to one skilled in the art that the above described embodiments are merely illustrative of but a few of many possible specific embodiments of the present invention. Numerous and varied other arrangements can be readily deviced by those skilled in the art without departing from the spirit and scope of the invention.

What is claimed is:

1. A method of controlling an air conditioning apparatus comprising the steps of:
    monitoring the operating condition of at least one sensor which detects an ambient condition about an area to be air conditioned;
    selecting one of a plurality of calculation formulae for obtaining a desired outlet air temperature within an allowable range on the basis of the operating condition of said at least one sensor; and
    adjusting said air conditioning apparatus in accordance with said one of said plurality of calculation formulae.

2. A method of controlling an air conditioning apparatus as set forth in claim 1, wherein said at least one sensor includes a room air temperature sensor, an ambient air temperature sensor and a solar radiation sensor, and, when all of said sensors are properly monitoring the appropriate temperature, a desired outlet air temperature Tao is determined for setting through the following calculation formula:

$$Tao = Kset \cdot Tset - Kam \cdot Tam - Kr \cdot Tr - Kst \cdot ST + C$$

where Tset indicates a set temperature, Tam an ambient air temperature, ST a solar radiation value and Kset, Kam, Kr, Kst and C indicate constants.

3. A method of controlling an air conditioning apparatus as set forth in claim 1, wherein said at least one sensor includes a room air temperature sensor and an ambient air temperature sensor, and, when said room air temperature sensor is not properly monitoring room air temperature and said ambient air temperature sensor is properly monitoring ambient air temperature, a desired outlet air temperature Tao is determined for setting through the following calculation formula:

$$Tao = Cam(Tset - Tam) + Tset$$

where Tset indicates a set temperature, Tam an ambient air temperature and Cam a constant.

4. A method of controlling an air conditioning apparatus as set forth in claim 1, wherein said at least one sensor includes a room air temperature sensor and an ambient air temperature sensor, and, when said sensors are not properly monitoring the appropriate temperature, a desired outlet air temperature is set to a preset comfortable temperature.

5. A method of controlling an air conditioning apparatus as set forth in claim 1, wherein said at least one sensor includes a room air temperature sensor and an ambient air temperature sensor, and, when said ambient air temperature sensor is not properly monitoring ambient air temperature and said room air temperature sensor is properly monitoring room air temperature, a desired outlet air temperature is determined for setting through the following calculation formula:

$$Tao = Cr(Tset - Tr) + Tset$$

where Tset indicates a set temperature, Tr a room air temperature and Cr a constant.

6. A method of controlling an air conditioning apparatus as set forth in claim 1, wherein said at least one sensor includes a water temperature sensor, and, when said sensor is not properly monitoring water temperature, a water temperature value is fixed to a preset value.

7. A method of controlling an air conditioning apparatus as set forth in claim 1, wherein said at least one sensor includes a room air temperature sensor, an ambient air temperature sensor and a solar radiation sensor, and when said room air temperature sensor and said ambient air temperature sensor are properly monitoring the appropriate temperature, and said solar radiation sensor is not properly monitoring solar radiation, a desired outlet air temperature Tao is determined for setting through the following calculation formula:

$$Tao = Kset \cdot Tset - Kam \cdot Tam - Kr \cdot Tr + C$$

where Tset indicates a set temperature, Tam an ambient air temperature, Tr a room air temperature and Kset, Kam, Kr and C indicate constants.

8. A method of controlling an air conditioning apparatus as set forth in claim 1, wherein said at least one sensor includes an evaporator outlet temperature sensor, and, when said sensor is not properly monitoring the evaporator outlet temperature, a compressor is turned "ON" and the evaporator outlet temperature is fixed to a preset value.

9. A method of controlling an air conditioning apparatus as set forth in claim 4, wherein said comfortable temperature is 25° C.

10. A method of controlling an air conditioning apparatus as set forth in claim 6, wherein said preset water temperature is 80° C.

11. A system for controlling an air conditioning apparatus for a vehicle comprising:
a plurality of sensing means for monitoring an ambient condition about an area to be air conditioned; and
processing means for;
monitoring the operating condition of at least one of said plurality of sensing means,
selecting one of a plurality of calculation formulae for obtaining a desired outlet air temperature within an allowable range on the basis of the operating condition of said at least one sensing means,
adjusting said air conditioning apparatus in accordance with said one of said plurality of calculation formulae.

12. A system for controlling an air conditioning apparatus as set forth in claim 11, wherein said plurality of sensing means includes a room air temperature senor, an ambient air temperature sensor and a solar radiation sensor, and, when, all of said sensors are properly monitoring the appropriate temperature, said processing means determines a desired outlet air temperature Tao for setting through the following calculation formula:

$$Tao = Kset \cdot Tset - Kam \cdot Tam - Kr \cdot Tr - Kst \cdot St + C$$

where Tset indicates a set temperature, Tam an ambient air temperature, ST a solar radiation value and Kset, Kam, Kr, Kst and C indicate constants.

13. A system for controlling an air conditioning apparatus as set forth in claim 11, wherein said plurality of sensing means includes a room air temperature sensor and an ambient air temperature sensor, and, when said room air temperature sensor is not properly monitoring room air temperature and said ambient air temperature is properly monitoring ambient air temperature, said processing means determines a desired outlet air temperature Tao for setting through the following calculation formula:

$$Tao = Cam(Tset - Tam) + Tset$$

where Tset indicates a set temperature, Tam an ambient air temperature and Cam a constant.

14. A system for controlling an air conditioning apparatus as set forth in claim 11, wherein said plurality of sensing means includes a room air temperature sensor and an ambient air temperature sensor, and, when said sensors are not properly monitoring the appropriate temperature, said processing means sets a desired outlet air temperature to a preset comfortable temperature.

15. A system for controlling an air conditioning apparatus as set forth in claim 11, wherein said plurality of sensing means includes a room air temperature sensor and an ambient air temperature sensor, and, when said ambient air temperature sensor is not properly monitoring ambient air temperature, and said room air temperature sensor is properly monitoring room air temperature, said processing means determines a desired outlet air temperature for setting through the following calculation formula:

$$Tao = Cr(Tset - Tr) + Tset$$

where Tset indicates a set temperature, Tr a room air temperature and Cr a constant.

16. A system for controlling an air conditioning apparatus as set forth in claim 11, wherein said plurality of sensing means includes a water temperature sensor, and, when said sensor is not properly monitoring water temperature, said processing means sets a water temperature value to a preset value.

17. A system for controlling an air conditioning apparatus as set forth in claim 11, wherein said plurality of sensing means includes a room air temperature sensor, an ambient temperature sensor and a solar radiation sensor, and when said room air temperature sensor and said ambient air temperature sensor are properly monitoring the appropriate temperature and said solar radiation sensor is not properly monitoring solar radiation, said processing means determines a desired outlet air temperature Tao for setting through the following calculation formula:

$$Tao = Kset \cdot Tset - Kam \cdot Tam - Kr \cdot Tr + C$$

where Tset indicates a set temperature, Tam an ambient air temperature, Tr a room air temperature, and Kset, Kam, Kr and C indicate constants.

18. A system for controlling an air conditioning apparatus as set forth in claim 11, wherein said plurality of sensing means includes an evaporator outlet temperature sensor, and, when said sensor is not properly monitoring evaporator outlet temperature, said processing means causes a compressor to turn "ON" and sets an evaporator outlet temperature to a preset value.

* * * * *